(12) United States Patent
Yu

(10) Patent No.: US 9,703,345 B2
(45) Date of Patent: Jul. 11, 2017

(54) ELECTRONIC DEVICE AND POWER MANAGEMENT CONTROL METHOD

(71) Applicant: MStar Semiconductor, Inc., Hsinchu County (TW)

(72) Inventor: Tien-Hua Yu, Hsinchu County (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 800 days.

(21) Appl. No.: 14/083,607

(22) Filed: Nov. 19, 2013

(65) Prior Publication Data
US 2014/0197688 A1 Jul. 17, 2014

(30) Foreign Application Priority Data

Jan. 11, 2013 (TW) .............................. 102101149 A

(51) Int. Cl.
  *H02J 11/00* (2006.01)
  *G06F 1/30* (2006.01)
(52) U.S. Cl.
  CPC .............. *G06F 1/30* (2013.01); *Y10T 307/469* (2015.04)
(58) Field of Classification Search
  CPC ................................ G06F 1/30; Y10T 307/469
  USPC .......................................................... 307/125
  See application file for complete search history.

(56) References Cited

U.S. PATENT DOCUMENTS

| | | | | |
|---|---|---|---|---|
| 4,952,817 A * | 8/1990 | Bolan | ................... | G06F 1/3209 307/39 |
| 5,097,154 A * | 3/1992 | Adams | ..................... | G06F 1/30 327/142 |
| 5,249,298 A * | 9/1993 | Bolan | ...................... | G06F 1/24 713/340 |
| 6,704,880 B2 * | 3/2004 | Dai | ........................ | G06F 1/3203 327/544 |
| 7,453,311 B1 * | 11/2008 | Hart | ........................ | G05F 3/242 327/534 |
| 7,577,858 B2 * | 8/2009 | Garg | ...................... | G11C 5/143 326/136 |
| 7,657,290 B2 * | 2/2010 | Veselic | ................ | H04B 1/1607 320/116 |
| 8,564,158 B2 * | 10/2013 | Poyner | ................ | A47L 15/0049 307/115 |
| 2011/0260553 A1 * | 10/2011 | Poyner | ................ | A47L 15/0049 307/115 |

FOREIGN PATENT DOCUMENTS

| TW | 475107 | 2/2002 |
|---|---|---|
| TW | 201117164 | 5/2011 |

OTHER PUBLICATIONS

Taiwan Intellectual Property Office (TIPO), Office Action issued Oct. 22, 2015.

\* cited by examiner

*Primary Examiner* — Jared Fureman
*Assistant Examiner* — Michael Warmflash
(74) *Attorney, Agent, or Firm* — WPAT, PC

(57) ABSTRACT

A power management method and associated electronic device are provided. The electronic device includes a power management circuit and a control circuit. The control circuit is powered by a power path. The power management method includes detecting whether the control circuit is powered, forwarding a control authority of the power path to the control circuit when the control circuit is powered, and forwarding the control authority to the power management circuit when the control circuit is not powered.

16 Claims, 4 Drawing Sheets

ELECTRONIC DEVICE AND POWER MANAGEMENT CONTROL METHOD

This application claims the benefit of Taiwan application Serial No. 102101149, filed Jan. 11, 2013, the subject matter of which is incorporated herein by reference.

BACKGROUND OF THE INVENTION

Field of the Invention

The invention relates in general to power management, and more particularly to a power management method and associated device for a power path powering an electronic device.

Description of the Related Art

With progress in technologies, industries demand higher standards on the power consumption of electronic devices. For example, Energy Star, a program backed by the US government, is a plan that assists businesses and consumers to be more environmentally friendly. The Energy Star plan specifies the power efficiency and standby power of many electrical appliances. By acquiring an Energy Star certification, a product is proven to conform to the Energy Star specification that ensures the efficiency of the product, thus leading to increased purchasing of the product by consumers.

Taking a computer monitor for example, the Energy Star defines the power consumption of three operation modes of the computer monitor. These three operation modes are an on mode, a sleep mode and an off mode. The on mode refers to a state in which an image on a screen changes according to image signals transmitted from a computer host; the sleep mode refers to a reduced-power state when the screen shows a blank image, and may be switched to the on mode by a request signal sent from the computer host; the off mode is a state in which, although the computer monitor is plugged in to power, the screen is basically not powered, displays no image, and awaits for a user or a computer signal to switch to the on mode. For example, the user may press a power key of the computer monitor to switch the computer monitor from the off mode to the on mode. According to the 2006 Energy Star specification, the power consumption for a computer monitor in the sleep mode must be below two watts, and the power consumption in the off mode must be below one watt.

Apart from reducing the power consumption of the computer monitor as much as possible in the off mode, various functions need to be considered in circuit design of the computer monitor. One of these functions is that, for example, the computer monitor needs to allow a user to determine whether the computer monitor is plugged in to an AC power source, including when operating in the off mode. Another function is that, for example, when the computer monitor loses and regains AC power, the computer monitor needs to automatically restore to its operational status from before AC power was lost.

SUMMARY OF THE INVENTION

The present invention discloses a power management method for an electronic device. The electronic device includes a power management circuit and a control circuit. The control circuit is powered by a power path. The power management method includes detecting whether the control circuit is powered, forwarding a control authority of the power path to the control circuit when the control circuit is powered, and forwarding the control authority of the power path to the power management circuit when the control circuit is not powered.

The present invention further discloses an electronic device powered by a power supply. The electronic device includes a power management circuit and a control circuit. The control circuit is powered by the power supply via a power path. The power management circuit includes a control selection device. The control selection device forwards a control authority of the power path to the control circuit when the control circuit is powered, and forwards the control authority of the power path to the power management circuit when the control circuit is not powered.

The above and other aspects of the invention will become better understood with regard to the following detailed description of the preferred but non-limiting embodiments. The following description is made with reference to the accompanying drawings.

DETAILED DESCRIPTION OF THE INVENTION

This description uses a computer monitor as an example for illustrating an embodiment of the present invention, but is not intended to limit the present invention. The present invention is applicable to any electronic device that needs to switch between an extremely power-saving off mode and a powered mode for normal operations. For example, the on mode and the sleep mode defined by Energy Star are two types of powered modes, and the off mode defined by Energy Star is an off mode that is extremely power-saving.

Figure 1:
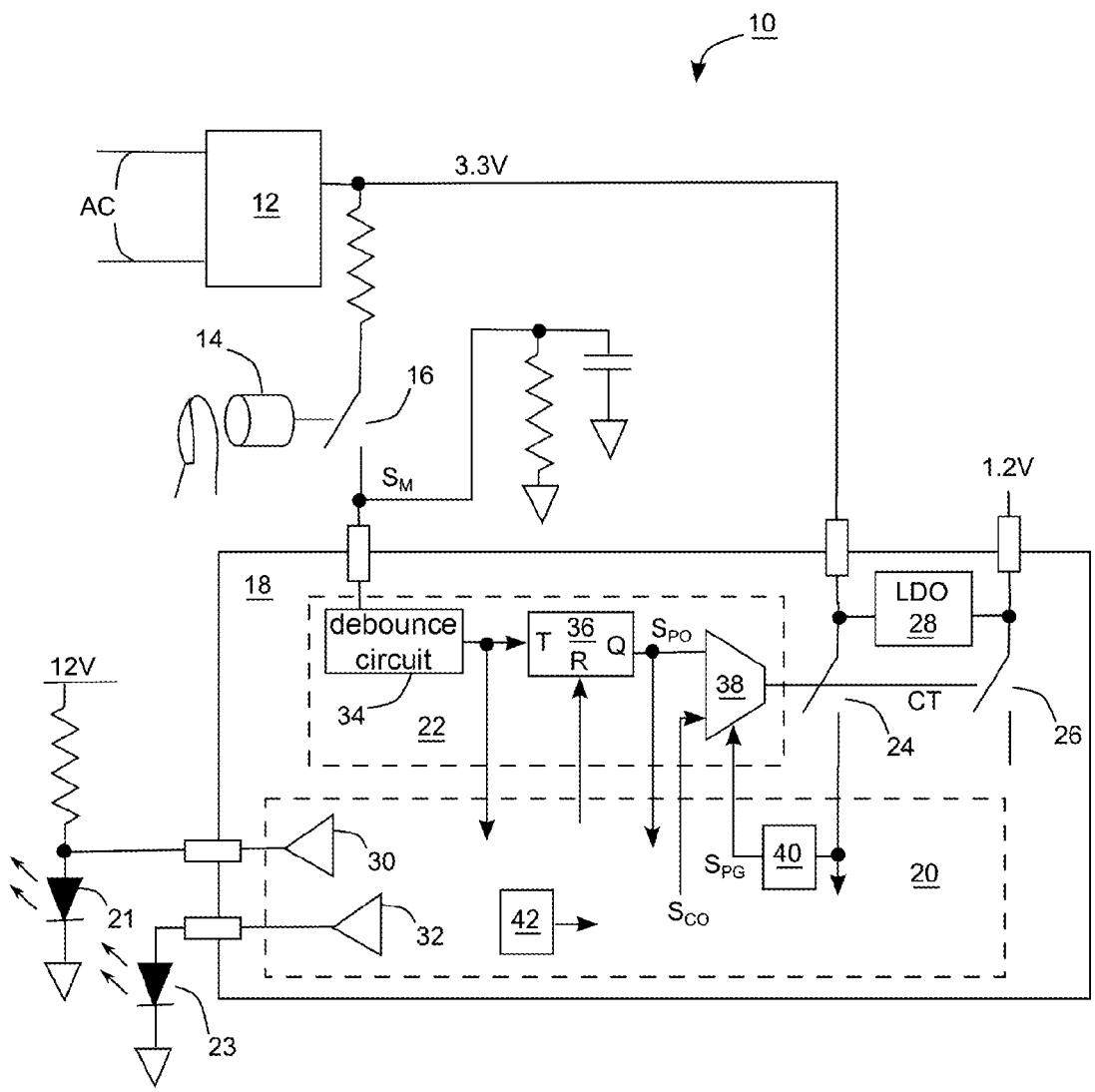
FIG. 1 is an exemplary control circuit for a computer monitor according to an embodiment of the present invention.

FIG. 1 shows an exemplary management circuit 10 of a computer monitor according to an embodiment of the present invention. The management circuit 10 includes a power converter 12, a power key 14, a first switch 16, an electronic device 18, a first light-emitting diode (LED) 21 and a second light-emitting diode 23, and multiple peripheral components. The power converter 12 converts a high-voltage alternating current (AC) power (e.g., 110 ACV) into 3.3V direct current (DC) power. The electronic device 18 includes a control circuit 20, a power management circuit 22, a second power switch 24, a third power switch 26, and a linear dropout regulator (LDO) 28. The electronic device, for example, is a monolithic integrated circuit, and has numerous pins for electrically coupling to external elements. The control circuit 20 includes a microcontroller and a scaler, and is for controlling operations and image display of a screen of a computer monitor.

The second power switch 24 is between the 3.3V DC power and the control circuit 20, and switches a power path for whether to power the control circuit 20 with the 3.3V DC power. The LDO 28 provides a 1.2V DC power. The power third switch 26 switches another power path for whether to power the control circuit 20 with the 1.2V DC power.

Control terminals CT of the second power switch 24 and third power switch 26 are connected to the power management circuit 22.

The 3.3V DC power is capable of continually powering the power management circuit 22. According to a mode switching signal $S_M$, the power management circuit 22 may control the second power switch 24 and the third power switch 26 to determine an operation mode of the electronic device 18. For example, when a user presses the power key 14 once, the electronic device 18 switches from an off mode to a powered mode; when the user again presses the power key 14, the electronic device 18 switches from the powered mode to the off mode. In the off mode, the second power switch 24 and the third power switch 26 are both open and the two power paths controlled by the second and third power switches 24 and 26 are both disconnected, such that the neither of the 3.3V or 1.2V DC powers power the control circuit 20 to achieve an extremely power-saving effect. In the powered mode, the second power switch 24 and the third power switch 26 are both closed and their two power paths are both connected, such that both of the 3.3V and 1.2V DC power sources supply power the control circuit 20 to provide required electric power.

When a user presses the power key 14, the first switch 16 is closed, and the voltage of the mode switching signal $S_M$ is 3.3V in logic "1". When the user releases the power key 14, the first switch 16 reverts to an open state, and the voltage of the mode switching signal $S_M$ becomes 0V in logic "0". Thus, the mode switching signal $S_M$ in logic "1" indicates the occurrence of a state of being currently pressed. For illustration purposes, in the description below, a signal in logic "1" indicates that the voltage of the signal is at a high level, and a signal in logic "0" indicates that the voltage of the signal is at a low level. For a person skilled in the art, instead of distinguishing the signals in logic "0" and logic "1" by a voltage level, the signals in logic "0" and logic "1" may be distinguished by other means, e.g., distinguished by a current level.

The power management circuit 22 includes a debounce circuit 34, a rising-edge-triggered T flip-flop 36, and a multiplexer 38. The debounce circuit 34 prevents noises in the mode switching signal $S_M$ from erroneously triggering the T flip-flop 36. The T flip-flop 36 is a latch circuit and may be regarded as a device for recording an operation state in the management circuit 22. When a rising edge of the mode switching signal $S_M$ occurs, the T flip-flop 36 inverts its power status signal output $S_{PO}$ (i.e., changing the logic value from "0" to "1" or from "1" to "0"). The power status signal output $S_{PO}$ value of "1", is predetermined to represent a powered mode. The multiplexer 38 is a control selection device for forwarding the control authority of the two power paths to the power management circuit 22 or the control circuit 20. When a power normal signal $S_{PG}$ is logic "0", a control end CT receives the power status signal output $S_{PO}$, meaning that the control authority of the two power paths is forwarded to the T flip-flop 36. At this point, as the control circuit 20 is not powered, so the two power paths are controlled only by the power management circuit 22. When the power normal signal $S_{PG}$ is logic "1", the control end CT receives the control signal output $S_{CO}$, meaning that the control authority of the two power paths is forwarded to the control circuit 20 via the power management circuit 22. When the high-voltage AC power initially starts powering, the control authority of the two power paths is pre-assigned to the power management circuit 22 since an initial value of the power normal signal $S_{PG}$ is "0".

The control circuit 20 includes a power status detector 40. When power normal signal $S_{PG}$ is logic "1", a 3.3V power is present at an input end of the power status detector 40, meaning that the control circuit 20 is normally powered by the 3.3V DC power. Conversely, when the power normal signal $S_{PG}$ is logic "0", it means that the control circuit 20 is not normally powered as the power path is possibly disconnected or the 3.3V DC power is not established (e.g., a power-off of the high-voltage AC power).

The control circuit 20 further includes a non-volatile memory 42, which records whether the electronic device 18 is currently operating under a powered mode or off mode. In one embodiment, when the mode switch signal $S_M$ is 1, the power status signal output $S_{PO}$ is recorded in the non-volatile memory 42. The control circuit 20 determines the control signal output $S_{CO}$ according to a recorded value in the non-volatile memory 42.

Figure 2:
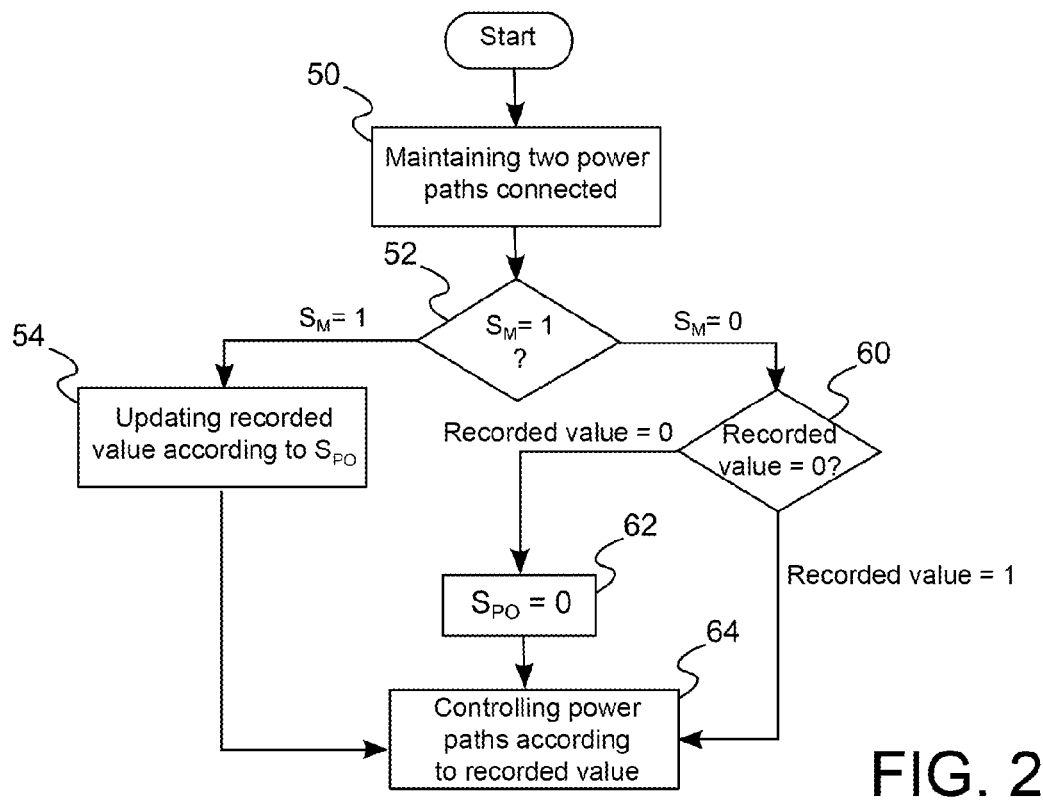
FIG. 2 is an exemplary startup procedure of a control circuit.

FIG. 2 shows a flowchart as an example for illustrating a startup procedure of the control circuit 20 initiated either by the user pressing power key 14 to toggle power on, or by restoration of previously interrupted power. When control circuit 20 starts, it means that the power normal signal $S_{PG}$ is logic "1", the power status signal output $S_{PO}$ and control signal output $S_{CO}$ are both logic "1", and the two power paths are controlled by the control circuit 20. In step 50, the two power paths are known to be connected. In step 52, a logic value of the mode switching signal $S_M$ is determined. At this point, if the mode switching signal $S_M$ is logic "1", it means that the startup procedure was initiated by pressing the power key 14 (the occurrence of a press event). In contrast, when mode switching signal $S_M$ is logic "0", it means that the startup procedure was initiated by the power converter 12 again supplying the 3.3V DC power after an interruption.

If the mode switching signal $S_M$ is "1" in step 52, step 54 is performed. In step 54, the power status signal output $S_{PO}$ (logic "1" at this point) is recorded into the non-volatile memory 42. Step 54 records the current power operation status as a "powered" mode into the non-volatile memory 42.

If the mode switching signal $S_M$ is "0" in step 52, step 60 is performed to determine the previous power status signal output $S_{po}$ value recorded in the non-volatile memory 42. When the recorded value is an "off" mode (logic "0"), step 62 is performed. In step 62, the T flip-flop 36 changes the power status signal output $S_{PO}$ from logic "1" to logic "0". In this way, step 62 restores the power status signal output $S_{PO}$ to reflect the "power off" state that existed before the 3.3V DC power was interrupted. Step 64 follows the result of step 60, step 62 or step 54. In step 64, the control circuit 20 sets the control signal output $S_{CO}$ according to the recorded value in the non-volatile memory 42 to control the two power paths.

Figure 3:
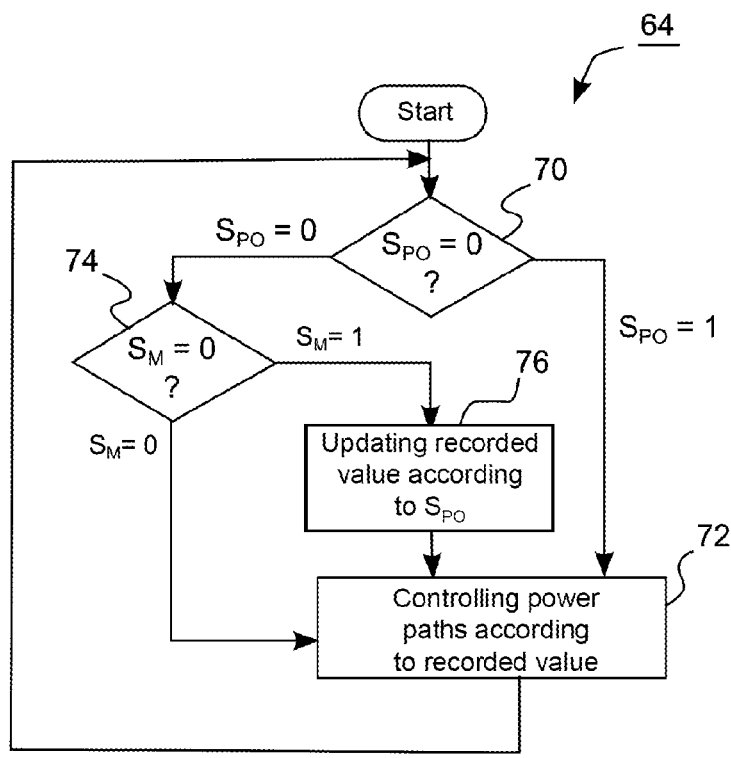
FIG. 3 is an example of step 64 in FIG. 2.

FIG. 3 shows a flowchart as an example of step 64 in FIG. 2. In step 70, the power status signal output $S_{PO}$ of the T flip-flop 36 is checked. When the power status signal output $S_{PO}$ is "1", step 72 is performed, in which the control circuit 20 controls the two power paths according to the recorded value in the non-volatile memory 42. If the recorded value is "1" and the control signal output $S_{CO}$ is also "1", this indicates a "powered" mode. Conversely, if the recorded value is "0" and the control signal output $S_{CO}$ is also "0", this indicates an "off" mode. In step 70, when the power status signal output $S_{PO}$ of the T flip-flop 36 is "0", it means that an "off" mode is to be entered and step 74 is performed. In step 74, it is determined whether the mode switching signal $S_M$ is "1", i.e., it is determined whether a user currently presses the power key 14. When the mode switching signal $S_M$ is "1", it means that an "off" mode is to be entered due to a press event. Thus, in step 76, the power status signal output $S_{PO}$ ("0" at this point) is recorded in the non-volatile memory 42 to record the power operation status as an "off" mode. When the mode switching signal $S_M$ in step 74 is "0", it means that an "off" mode is to be entered because the power converter 12 no longer provides the 3.3V DC power, perhaps due to unplugging from, or other loss of, the high-voltage AC power. In this situation, the recorded value in the non-volatile memory 42 is maintained as a "powered" mode and not updated. As shown in FIG. 3, step 72 follows step 70, step 76 or step 74, to control the two power paths according to the recorded value in the non-volatile memory 42. Once the control circuit 20 loses power, the power normal signal $S_{PG}$ changes to logic "0", and the multiplexer 38 forwards the control authority of the two power paths to the T flip-flop 36 to determine whether to connect or disconnect the two power paths.

As seen from the analysis in FIGS. 1, 2 and 3, when the high-voltage AC power is stable and the 3.3V DC power continually powers the power management circuit 22, the mode switching signal $S_M$ is capable of switching an operation mode of the electronic device 18. Further, when the high-voltage AC power has been previously lost and later regained, the electronic device 18 is restored to the "powered" or "off" mode as it was before the high-voltage AC power was lost.

Assume that, at a particular time point, the electronic device 18 is normally powered by the 3.3V DC power and is in an off mode as its operation mode, the power status signal output $S_{PO}$, the power normal signal $S_{PG}$ and the recorded value in the non-volatile memory 42 are all "0", and the two power paths are directly controlled by the T flip-flop 36 to be in a disconnected state. When the user presses the power key 14, the mode switching signal $S_M$ changes from "0" to "1", the power status signal output $S_{PO}$ first changes to "1", and the control circuit 20 undergoes steps 50, 52, 54 and 64. The process eventually stays at a loop formed by step 70 and step 72 in step 64. In the loop, the power status signal output $S_{PO}$, the control signal output $S_{CO}$ and the recorded value in the non-volatile memory 42 are all "1", and the electronic device 18 operates in a powered mode.

In the powered mode, when the user presses the power key 14, the mod switching signal $S_M$ changes from "0" to "1", the power status signal output $S_{PO}$ changes to "0", and the control circuit 20 sequentially undergoes steps 70, 74, 76 and 72. In step 72, the control authority of the two power paths is forwarded to the T flip-flop 36. At this point, the power status signal output $S_{PO}$, the control signal output $S_{CO}$, the power normal signal $S_{PG}$, and the recorded value in the non-volatile memory 42 are all "0". Thus, the power status signal output $S_{PO}$ continually keeps the two power paths disconnected, and the electronic device 18 operates in an "off" mode.

Regardless of whether the electronic device 18 is in a "powered" mode or an "off" mode, when the high-voltage AC power is unplugged, the recorded value in the non-volatile memory 42 reliably records the operation mode at the time when of the unplugging event. The recorded values of "0" and "1" respectively represent the "off" mode and the "powered" mode.

When the high-voltage AC power is initially provided, the control circuit 20 first undergoes steps 50, 52 and 60. Assume that the recorded value in the non-volatile memory 42 is "1" (representing a "powered" mode), the control circuit 20 then undergoes step 64 from step 60, and stays at a loop formed by steps 70 and 72. At this point, the power status signal output $S_{PO}$, the control signal output $S_{CO}$ and the recorded value in the non-volatile memory 42 are all "1". The electronic device 18 accordingly operates in a powered mode as recorded in the non-volatile memory 42.

When the high-voltage AC power is initially provided, if the recorded value in the non-volatile memory 42 is "0" (representing an "off" mode), the control circuit 20 first undergoes steps 50, 52 and 60, changes the power status signal output $S_{PO}$ from "1" to "0" in step 62, and enters step 64. The control circuit 20 then sequentially undergoes steps 70, 74 and 72. In step 72, the two power paths are disconnected according to the recorded value in the non-volatile memory 42, and the control authority of the two power paths is forwarded to the power management circuit 22. At this point, as the power status signal output $S_{PO}$ of the T flip-flop 36 is "0", the two power paths are kept disconnected, and so the electronic device 18 enters an "off" mode recorded by the recorded value in the non-volatile memory 42.

The control circuit 20 includes a first output 30 and a second output 32 for respectively driving the first LED 21 and the second LED 23, which may serve as lamp indicators for informing a user of the current operation mode of the electronic device 18. For example, the outputs 30 and 32 can both be tristate outputs. When the control circuit 20 operates in an "off" mode, both of the outputs 30 and 32 are in high impedance. As shown in FIG. 1, in an "off" mode, given that high-voltage AC power is present and the first output 30 is in high impedance, the first LED 21 may illuminate to inform a user that a current mode is an "off" mode and the high-voltage AC power is present. Similarly, in a powered mode, the control circuit 20 may keep the first LED 21 from illuminating and control whether to illuminate the second LED 23 to inform a user that a current mode is a "powered" mode.

Thus, a computer monitor adopting the management circuit 10 in FIG. 1 allows a user to learn whether the computer monitor is plugged into AC power, and, when the computer monitor previously loses and then regains the AC power, enables the computer monitor to automatically restore to an operation mode as it existed before the AC power was lost.

Figure 4:
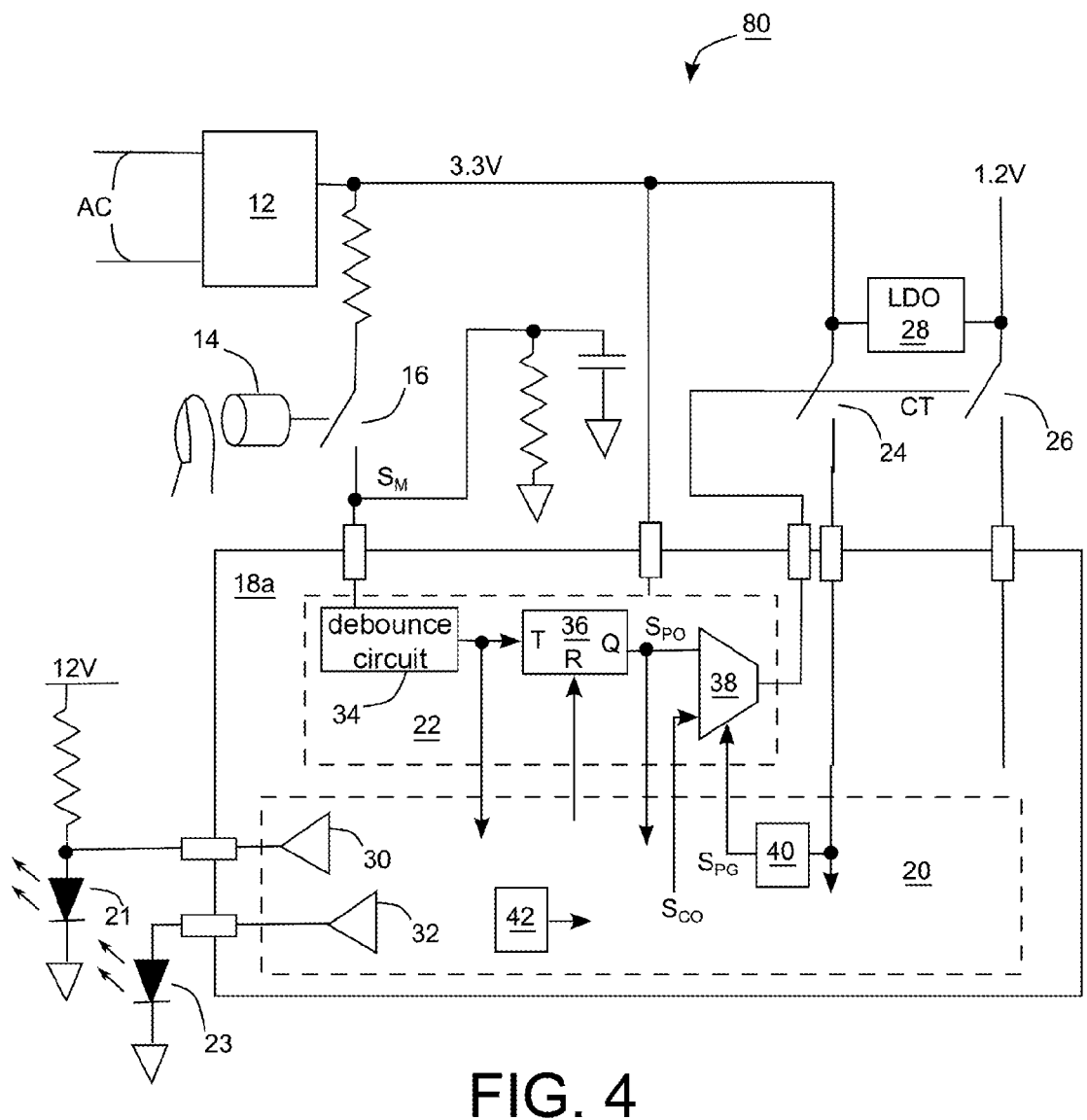
FIG. 4 is another control circuit.

When the electronic device 18 in FIG. 1 is implemented by an integrated circuit, the second power switch 24 and the third power switch 26 control whether the power path of the control circuit 20 is powered. Therefore, the second power switch 24 and the third power switch 26 may require a low conduction impedance and thus a large component size. The above consideration may add manufacturing complications and chip costs to the electronic device 18. FIG. 4 shows another management circuit 80. A main difference of the management circuit 80 in FIG. 3 from that in FIG. 1 is that, the second power switch 24 and third power switch 26 and the LDO 28 are disposed outside an electronic device 18*a*. The electronic device 18*a* may be implemented by an integrated circuit. An output of the multiplexer 38 controls the control terminals of the second power switch 24 and third power switch 26 via a general-purpose input/output (GPIO) pin. Operations of the management circuit 80 in FIG. 4 may be referred from corresponding description associated with FIG. 1, and shall be omitted herein.

The present invention is not limited to a computer monitor. For example, the present invention is also applicable to power management control of a sound system.

Figure 5:
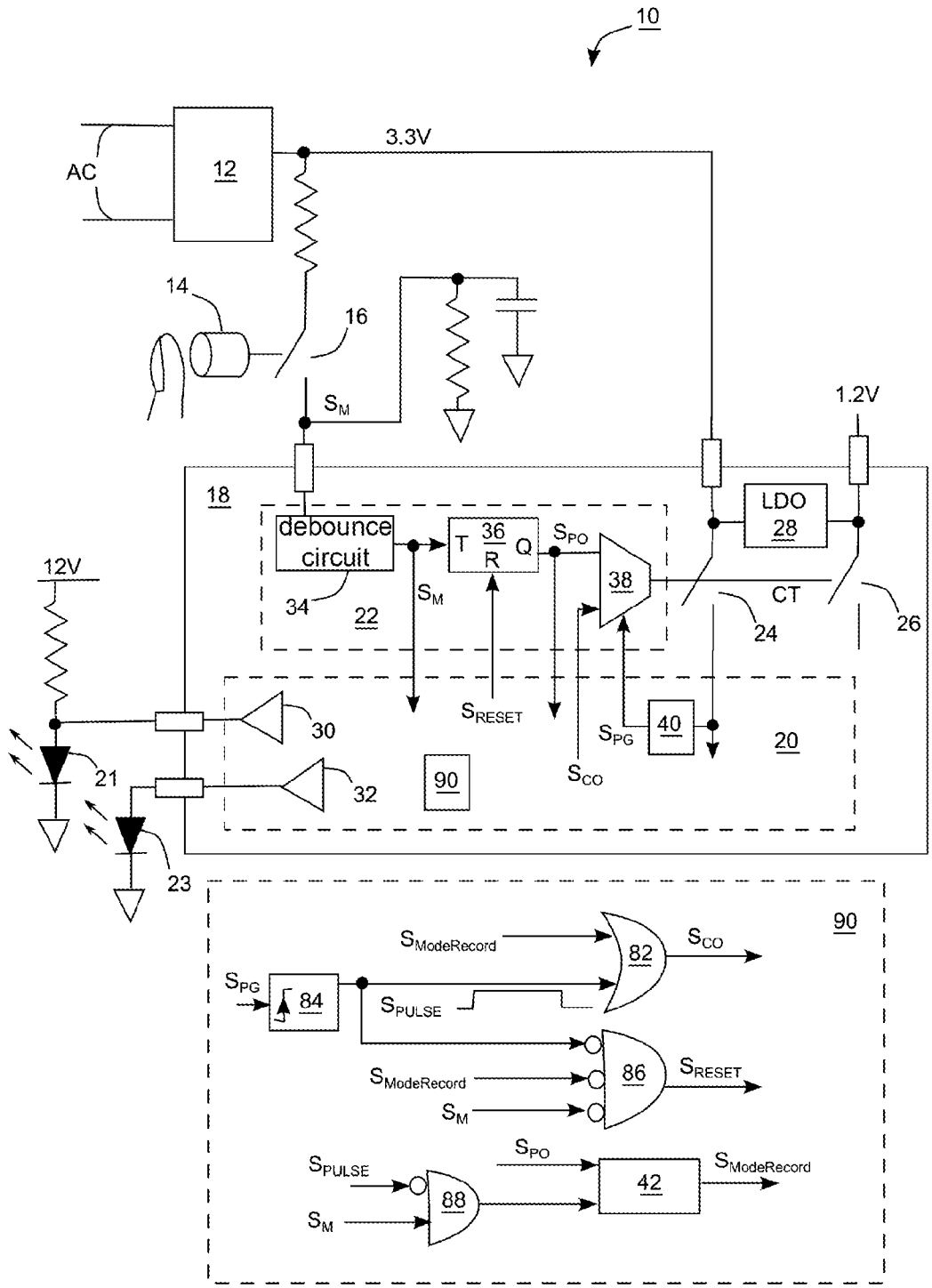
FIG. 5 is details of a status controller 90 in the control circuit 20 in FIG. 1.

FIG. 5 shows a status controller 90, in the control circuit 20, for implementing the processes in FIGS. 2 and 3. The status controller 90 includes a pulse generator 84, an OR gate 82, a first AND gate 86, a second AND gate 88, and the non-volatile memory 42.

When a rising edge in the power normal signal $S_{PG}$ occurs, the pulse generator 84 provides a pulse signal $S_{PULSE}$ having a fixed time length, as shown in FIG. 5. Through the OR gate 82, the pulse signal $S_{PULSE}$ may initially, temporarily maintain the control signal output $S_{CO}$ as logic "1" in the startup procedure. Through the first AND gates 86 and the second AND gate 88, the pulse signal $S_{PULSE}$ may prevent the T flip-flop 36 from being reset and the non-volatile memory 42 from being written during the startup procedure. Thus, step 50 in FIG. 2 can be stably performed. As controlled by the OR gate 82, after the startup procedure, a recorded value $S_{ModeRecord}$ in the non-volatile memory 42 determines the control signal output $S_{CO}$, and step 72 in FIG. 3 is performed.

When the mode switching signal $S_M$ is logic "1", it means that the operation mode of the electronic device 18 is determined by the power status signal output $S_{PO}$ caused by pressing the power key 14. Therefore, the recorded value $S_{ModeRecord}$ in the non-volatile memory 42 is updated by the power status signal output $S_{PO}$ to perform step 54 in FIG. 2 and step 76 in FIG. 3.

Conversely, when the mode switching signal $S_M$ is logic "0", it means that the power key 14 is not pressed. At this point, the second AND gate 88 prevents the recorded value $S_{ModeRecord}$ from being changed. The control signal output $S_{CO}$ from the T flip-flop 36 may be reset to be the same as the recorded value $S_{ModeRecord}$ via the first AND gate 86 to perform step 62 in FIG. 2.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power management method, for an electronic device, wherein the electronic device comprises a power management circuit comprising a latch circuit, a control circuit comprising a non-volatile memory, and a power path, the power management method comprising:
   detecting whether the control circuit is powered;
   forwarding a control authority of the power path to the control circuit when the control circuit is powered;
   forwarding the control authority of the power path to the power management circuit when the control circuit is not powered;
   switching an output of the latch circuit according to a mode switching signal; and
   updating a recorded value in the non-volatile memory according to the output of the latch circuit when said mode switching signal indicates that a mode switching event occurs;
   wherein, the mode switching signal initiates determining whether to power the control circuit and is triggered by a user.

2. The power management method according to claim 1, further comprising:
   updating the output of said latch circuit according to said recorded value in said non-volatile memory in a startup procedure.

3. The power management method according to claim 1, further comprising:
   controlling the power path with said control circuit according to a recorded value in the non-volatile memory.

4. An electronic device, powered by a power supply, comprising:
   a control circuit, comprising a non-volatile memory, powered by the power supply via a power path;
   a power management circuit, comprising a control selection device and a latch circuit, wherein said control selection device selects said control circuit to control said power path when the control circuit is powered, otherwise said power management circuit controls said power path; and
   a power switch, coupled to the power management circuit, wherein when said power switch provides a mode switching signal indicating a mode switching event by a user, and said mode switching signal initiates determining whether to power said control circuit;
   wherein, said latch circuit switches and outputs an output according to said mode switching signal; and
   wherein, when said mode switching signal indicates that said mode switching event occurs, said control circuit updates a recorded value in the non-volatile memory according to the output of said latch circuit.

5. The electronic device according to claim 4, wherein said control circuit comprises a power status detector configured to detect whether said control circuit is powered.

6. The electronic device according to claim 4, wherein said control circuit updates said output of said latch circuit according to said recorded value in said non-volatile memory in a startup procedure.

7. The electronic device according to claim 4, wherein, when said control selection device selects said control circuit to control said power path, said control circuit controls said power path according to a recorded value in said non-volatile memory.

8. The electronic device according to claim 4, wherein when said control selection device selects said latch circuit to control said power path, said power management circuit controls said power path according to said output of the latch circuit.

9. The electronic device according to claim 4, wherein said control selection device is a multiplexer.

10. The electronic device according to claim 4, wherein said power path is controlled by said power management circuit when said power supply initially starts powering.

11. The electronic device according to claim 4, wherein said control circuit comprises a tristate output configured to drive a light-emitting diode (LED).

12. The electronic device according to claim 11, wherein said LED illuminates when said power supply powers the electronic device and said tristate output is in high output impedance.

13. The electronic device according to claim 4,
   wherein said power switch controls whether to allow said control selection device to make any selection for controlling said power path.

14. The power management method according to claim 1, further comprising:
   determining a status of said electronic device according to both said output of said latch circuit and said recorded value in said non-volatile memory.

15. The electronic device according to claim 4, wherein a status of said electronic device is determined according to both said output of said latch circuit and said recorded value in said non-volatile memory.

16. The electronic device according to claim 4, wherein said power path provides a first current and a second current to said control circuit, and said first current and said second current are different.

* * * * *